Sept. 2, 1969                    R. R. TODD                    3,464,471
                           BLOWER SPOUT MECHANISM
Filed July 6, 1967                                           2 Sheets-Sheet 1

INVENTOR
ROBERT R. TODD
BY

Sept. 2, 1969  R. R. TODD  3,464,471
BLOWER SPOUT MECHANISM
Filed July 6, 1967  2 Sheets-Sheet 2

INVENTOR
ROBERT R. TODD
BY

United States Patent Office 3,464,471
Patented Sept. 2, 1969

3,464,471
BLOWER SPOUT MECHANISM
Robert R. Todd, Davenport, Iowa, assignor to J. I. Case Company, Racine, Wis., a corporation of Wisconsin
Filed July 6, 1967, Ser. No. 651,620
Int. Cl. B02c 13/288; A01f 17/04
U.S. Cl. 146—107          9 Claims

ABSTRACT OF THE DISCLOSURE

A compensating mechanism for maintaining the desirable position of a blower spout on a forage harvester. The blower spout includes a lower part fixed to the harvester and an upper part pivotally interconnected with the lower part. The mechanism has strut means connected with the upper spout and with the harvester frame to compensate for change in the attitude of the frame as it is tilted for low or high cutting or gathering of material by the front mounted attachment unit.

Background of the invention

The forage harvester has become increasingly important and valuable in the harvesting of row-crop or other crop material. The harvester is usually drawn by a tractor and the harvester, in turn, draws a trailing wagon for reception of and for carrying the chopped material. The harvester generally includes a base unit on a frame and a drive mechanism powered by the tractor. The base unit carries a cutting mechanism which chops the material into fine pieces and then blows the material out the delivery spout and into the wagon.

In the row-crop unit, the harvester has either a one, two, or more row attachment carried on the base unit at the front thereof for gathering and conveying the stalk material to the cutter wheel. The attachment also includes a cutting sickle or blade for severing the row-crop material at a point near the ground. Other attachments include a cutterbar unit having a sickle similar to a mower sickle which cuts standing hay or like material and then conveys the material to the cutter wheel, or a windrow pickup attachment which collects cut material and conveys it to the wheel. These attachments may be connected to the base unit so that the attachment pivots thereon when changing elevation of the row-crop points for low or high cutting of the stalk material. However, in a machine where the attachment pivots on the base unit, it may mean extra control mechanism to accomplish the cooperation between the attachment and base units. Also there may be difficulty in maintaining a smooth flow of material into the base unit. Some attachment units are fairly rigidly connected to the base unit so that the harvester frame, the attachment unit and consequently the blower spout all move together as the harvester is rotated about an axle or shaft for changing height of cut of the material. It is also desirable to raise the front of the attachment unit to avoid an obstacle such as a stump, a rock, a gopher mound or the like.

In a machine where the attachment unit is rigidly connected to the base unit and the base unit is carried on a frame, the frame is tiltable in a fore-and-aft direction to control or to change the cutting height or to avoid obstacles. When the attachment unit, the base unit, and the frame are tilted, the blower spout also tilts if it is rigidly connected to the base unit. The discharge spout thus changes position in relation to the ground and if there is sufficient movement, the upper portion of the spout may be forced into the wagon when the front end of the attachment unit is raised. In a lower position of the attachment unit, the spout is raised and the material may be thrown over the wagon. Also when turning corners the material may miss the wagon, although there are means for turning the spout in a direction so that the material is always delivered in the direction of the wagon. The correct fore-and-aft tilt of the spout is also a helpful advantage when turning a corner as it is sometimes desirable to lift the front of the attachment unit when not actually cutting stalk material.

Summary of the invention

The present invention relates to a forage harvester wherein the base unit is carried on a frame pivotable on an axle or shaft and the attachment unit is substantially rigidly connected to the base unit. The blower spout is, of course, fixed to the base unit and extends upwardly and rearwardly therefrom. A compensating or spout control mechanism is provided which substantially maintains the upper part of the spout relatively stationary when the base and attachment units are tilted in a fore-and-aft direction as the frame is rotated or turned on the axle.

The invention includes members fixed to the upper and lower spout portions which members are hingedly connected so that the upper part of the spout may be moved in relation to the lower part. A connecting member is pivotally attached to the frame and to the member fixed to the upper part of the spout so that as the frame is tilted, the upper part of the spout is correctly positioned for delivery of the chopped material into the wagon.

The principal object of this invention is to provide means for correctly positioning the blower spout on a forage harvester.

Another object is to provide means for controlling the position of the blower spout for a forage harvester where the attachment and base units are substantially rigidly connected.

A further object is to provide means for relative movement between the upper and lower parts of the blower spout.

An additional object is to provide means connected to the upper part of the spout and to the harvester frame for positioning the upper part in relation to the frame as the frame is tilted in a fore-and-aft direction.

Additional objects and advantages will become apparent from a reading of the following description taken together with the annexed drawings, in which.

Figure 1:
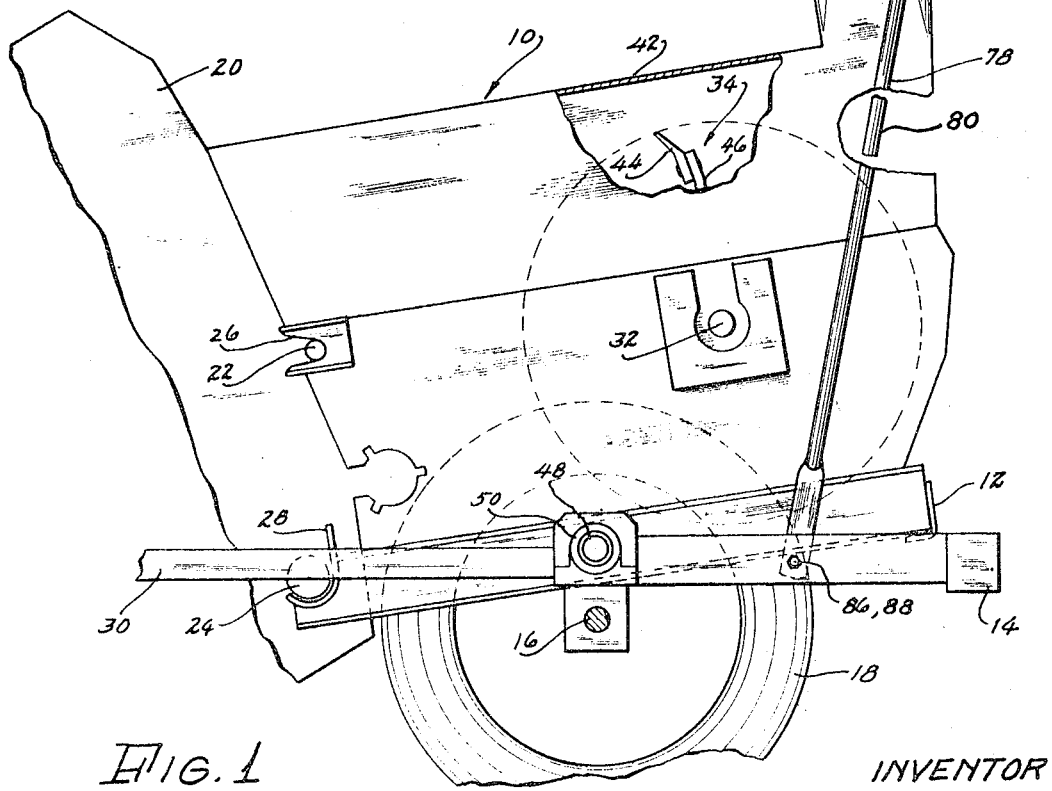
FIGURE 1 is a side view of part of a forage harvester tilted in a forward direction and showing the invention.

As seen in FIG. 1, there is shown a portion of a forage harvester including a base unit generally designated as 10 supported on a base frame 12 and a main frame 14 and carried on an axle 16 having ground wheels 18 journaled on the axle. The base unit carries an attachment unit 20 on the front thereof by means of shafts or pins 22 and 24 in sockets or jaws 26 and 28. With the pins in place and secured, the attachment unit is held substantially rigid with the base unit and therefore moves with the base unit. As mentioned, the attachment unit may be a row-crop unit, a cutterbar unit or a pickup unit, names by which these units are customarily called within the industry.

The harvester is drawn by a tractor, not shown, by means of a drawbar 30 secured to the main frame 14 so that the drawbar and the main frame remain on a substantially parallel plane in relation to the ground. The tractor drives a power-take-off which in turn drives a shaft 32 for turning a cutterwheel 34. The drive means is any suitable mechanism for driving the rotating parts of the harvester. The moving or rotating parts may include gathering and conveying chains, in a row crop unit as partly shown in FIG. 1, a sickle or other means for cutting stalk material, conveying aprons and rollers for moving the cut stalks of material rearward and, of course, the cutterwheel 34. The drive mechanism may include clutches and reversing devices such as are required in a machine of this type. The base unit 10, of course, is totally enclosed to contain the crop material as it is being chopped into fine pieces and then the pieces are blown or delivered into a spout 36.

Spout 36 includes a lower portion 38 and an upper portion 40. Portion 38 is rigidly secured to the base unit enclosure 42 at the rear thereof and provides a smooth opening or chute for delivery of the forage material from cutterwheel 34. It is understood, of course, that the cutterwheel includes a plurality of blades 44 secured to the shaft 32 by means of arms 46, the blades rotating in a CCW direction in the outlined path shown in FIG. 1.

Figure 2:
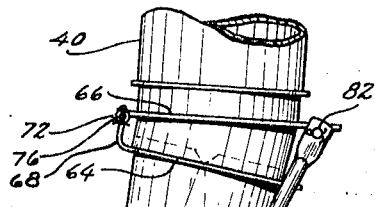
FIG. 2 is a side view of the same tilted in a rearward direction.
Figure 2:
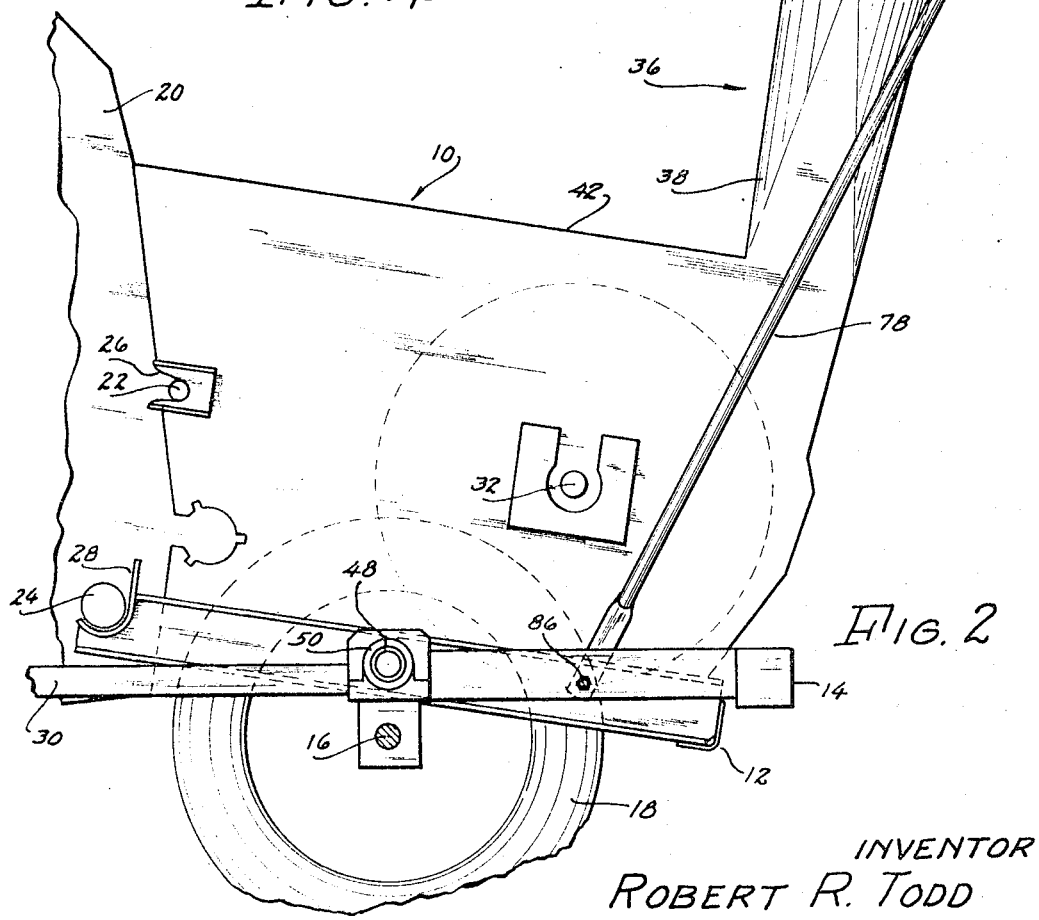

As seen in FIGS. 1 and 2, the base frame 12 pivots in a fore-and-aft direction in relation to the main frame 14 on a shaft 48 carried in bearings 50. As stated, the main frame 14 and the drawbar remain substantially in the same plane in relation to the ground, however the base frame 12 pivots on shaft 48. When the front of the attachment units is lowered to a position near the ground to pick up material which is down or to cut the stalk material nearer the ground, the base unit is tilted forward along with the attachment unit as shown in FIG. 1. When the attachment unit is raised to cut the material higher from the ground, the base unit is tilted rearward, as shown in FIG. 2. The different views show the attachment unit in the lowest and the highest position. Suitable means such as a hydraulic cylinder or other means may be used for positioning the attitude of the attachment unit is lowered to a position near frame, so that a plurality of positions are possible between the lowest and highest positions.

Figure 4:
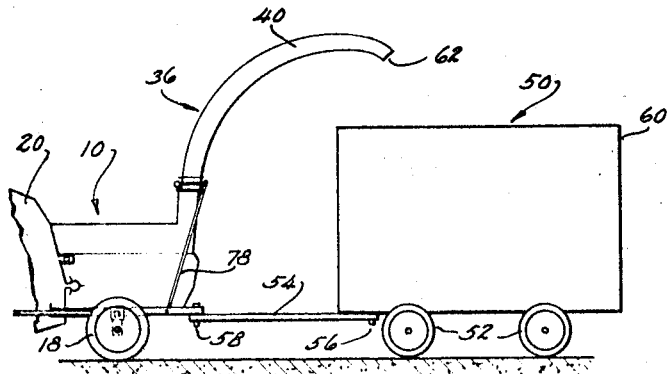
FIG. 4 is a reduced diagrammatic view of the rear part of the harvester in relation to a towed wagon.

When the base unit is tilted from a forward to a rearward position, a fixed or rigidly secured spout also is moved with the base unit. Since it is desired to direct the chopped material into a specific place, it is thus seen that the place of discharge would change as the attachment unit, the base unit and a fixed spout were tilted from a forward to a rearward attitude or vice versa. Normally, the chopped material is blown or delivered into a trailing wagon 50 or the like which is drawn by the harvester, as seen in FIG. 4. Wagon 50 is carried on wheels 52 and drawn by means of a hitch 54 pivoted as at 56 on the wagon and connected as at 58 to the harvester.

As can be realized, if the attachment unit and base unit are tilted forward, a fixed spout would also move in a CCW direction and the chopped material would be blown past the rear end 60 of wagon 58. On the other hand, if the attachment unit and base unit are tilted rearward, a fixed spout would move in a CW direction and the end 62 of spout 40 may dig into the material in the wagon particularly if the wagon was nearly full. If the end 62 of the spout buries itself in the chopped material, the spout may plug and fill with material.

The present invention provides a means for holding the upper portion 40 of the spout in a relatively stationary position as the base unit is rotated on shaft 48. Since it is desirable to connect the attachment unit direcly to the base unit for reasons of economy and simplicity and the like, it is a requirement that the spout be adaptable for various attitudes for proper delivery of the chopped material.

As seen in FIGS. 1 and 2, the lower portion 38 of spout 36 is smaller in diameter than the upper portion 40 so that the lower portion literally telescopes with the upper portion as the base unit is tilted. The upper extremity of spout portion 38 is shown in dotted lines in these figures. A smooth flow of material is assured at all times without leaving a gap between the spout portions.

Figure 3:
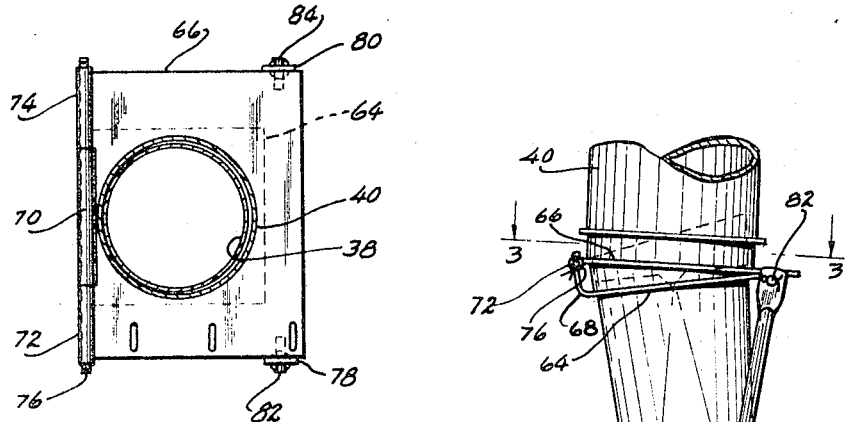
FIG. 3 is a view taken along line 3—3 of FIG. 1.

As seen in FIG. 3, a plate-like member 64 surrounds spout portion 38 and is fixed thereto as by welding. Another plate-like member 66, larger than plate 64, surrounds spout portion 40 and is also fixed thereto. Member 64 extends forwardly and upwardly as at 68 and includes a hinge structure 70 adjacent the spout. Member 66 also extends forwardly of spout portion 40 and includes hinge structures 72 and 74 aligned with hinge 70. A hinge pin 76 is inserted in and extends through structures 70, 72, and 74 such that the plate members pivot in relation to each other. Cotter keys are installed to keep the pin in the hinge structures.

A strut member 78 is pivotally connected to a rear corner portion of plate 66 and a like member 80 is pivotally connected to the other rear corner of plate 66. Pins 82 and 84 are preferred so that both strut members are pivotally aligned and dipsosed adjacent spout portion 38 and the cutterwheel enclosure.

Struts 78 and 80 extend downwardly and are pivotally connected with the main frame 14 by means of pins 86 and 88.

The relationship and location of the pivotal connections is such that the distance from the centerline of shaft 48 to pin 76 is equal to the distance from pin 82 to pin 86 and the distance from shaft 48 to pin 86 is equal to the distance from pin 76 to pin 82. Therefore, shaft 48, and pins 76, 82, and 86 are the corners of a four-sided figures in which the opposite sides are parallel and of equal length. The side of this figure between shaft 48 and pin 86 remains stationary with respect to the frame and the side of the figure between shaft 48 and pin 76 is stationary with respect to the base unit. Therefore, when the base unit and attachment unit are rotated on shaft 48 with respect to the main frame, the side formed by shaft 48 and pin 86 remains parallel to the side formed by pins 76 and 82. The centerline of spout portion 40 thus remains substantially in the same position as the base unit when its affixed lower spout portion 38 is tilted on shaft 48. This centerline remains parallel to its original position during such tilting. Assuming that the lower extremity of portion 40 is substantially vertical, it will be maintained in this position as the attachment and base units are tilted around shaft 48. The centerline of this extremity would therefore be approximately perpendicular to the ground level at all times.

In the operation of this blower spout elevation compensating mechanism or control, the lower and upper spout portions are hinged together on one side thereof, the lower portion 38 is fixed to the harvester base unit 10, and the upper portion 40 is free to pivot in relation to the lower portion around hinge pin 76. As the attachment unit and base unit are tilted forward, as in FIG. 1, the struts 78 and 80 stay with the main frame and the struts, being attached to the upper portion 40 of the spout, maintain that portion in substantially the same position even though the lower spout portion moves forward or in a CCW direction.

As the units are tilted rearward, as in FIG. 2, the struts keep the upper spout portion in the same relative position by reason of the equal sides formed by the pivotal points, even though the base unit and lower spout portion move rearward or in a CW direction around shaft 48.

It is thus seen that herein shown and described is a blower spout control which compensates for movement of the attachment and base units, and maintains the spout in a reasonably fixed position so that all the chopped material will be directed to and delivered into the wagon. The mechanism accomplishes all the objects and advantages as set out above and includes many desirable features. The invention is not intended to be taken as limited by the embodiment disclosed, nor in fact, in any manner except as defined in the following claims.

What is claimed as new and desired to be secured by Letters Patent of the United States is:

1. A blower spout control for a harvester having a frame, a cutter enclosure carried on the frame, and a blower spout connected to the cutter enclosure, said spout having a lower portion and an upper portion, and said control including hinge means on said spout, said hinge means having a first element fixed to said lower portion and a second element fixed to said upper portion, means interconnecting said first and second elements, and means connecting said frame and said second element for maintaining said upper portion in substantially the same position in relation to the ground when said enclosure is tilted.

2. A control in accordance with claim 1 wherein said means interconnecting said first and second elements includes pivot means disposed adjacent said spout.

3. A control in accordance with claim 1 wherein said means connecting said frame and said second element includes strut means pivotally attached to said members.

4. A control in accordance with claim 1 wherein said upper and lower portions include extremities which move in telescopic relation to each other as said cutter enclosure is tilted in a fore-and-aft direction.

5. A control in accordance with claim 1 wherein said first and second elements are generally rectangular plates fixed to said lower and upper spout portions.

6. A control in accordance with claim 5 wherein said elements include portions which swing toward and away from each other as said enclosure is tilted in a fore-and-aft direction.

7. A blower spout mechanism for a harvester having a main frame, a sub-frame tiltable on the main frame, a cutter unit on the sub-frame, an attachment unit connected to the cutter unit, and a delivery spout having two portions one of which is secured to the cutter unit, said mechanism including first means connected to one portion and second means connected to the other portion, hinge means connecting said first and second means, and strut means connecting said second means and said main frame whereby one of said spout portions is maintained at substantially the same elevation as said attachment unit is raised and lowered in relation to the ground.

8. A mechanism in accordance with claim 7 wherein said first and second means are pivotally connected adjacent said delivery spout and said portions move in telescopic relation as the elevation of said attachment unit is changed.

9. A mechanism in accordance with claim 7 wherein said strut means is pivotally connected to said main frame and to said second means for maintaining the upper of said spout portions at substantially the same elevation above the ground as said sub-frame and said cutter unit are tilted.

References Cited
UNITED STATES PATENTS

| 2,608,310 | 8/1952 | De Penning | 214—42 |
| 2,738,635 | 3/1956 | Gray | 146—107 |
| 3,229,451 | 1/1966 | Wenzel et al. | 56—10 |

ANTONIO F. GUIDA, Primary Examiner

U.S. Cl. X.R.

56—24; 214—42